455-612 AU 263 EX
1/1/85 OR 4,491,984

United States Patent [19]
Wiedmer

[11] Patent Number: 4,491,984
[45] Date of Patent: Jan. 1, 1985

[54] METHOD AND APPARATUS FOR DETECTING INTERRUPTIONS IN THE TRANSMISSION OF LIGHT SIGNALS

[75] Inventor: Jean-Pierre Wiedmer, Cortaillod, Switzerland

[73] Assignee: Cabloptic S.A., Cortaillod, Switzerland

[21] Appl. No.: 469,281

[22] Filed: Feb. 24, 1983

[30] Foreign Application Priority Data

Mar. 2, 1982 [CH] Switzerland ........................ 1258/82

[51] Int. Cl.³ ................................................ H04B 9/00
[52] U.S. Cl. .................................... 455/612; 455/606; 340/555

[58] Field of Search ................ 455/606, 612; 340/555, 340/556, 557, 815.13

[56] References Cited

U.S. PATENT DOCUMENTS 3,943,358 3/1976 Reymond et al. .................. 455/612

*Primary Examiner*—Joseph A. Orsino, Jr.
*Assistant Examiner*—Timothy K. Greer
*Attorney, Agent, or Firm*—Walter H. Schneider

[57] ABSTRACT

A method and apparatus for the detection of interruptions of light signal transmissions are disclosed, wherein on simultaneously sending light signals, from an emitter to a receiver, light signals pass through a loop of fiber optics, and a direct circuit comprised of a transparent block. The detection of interruptions of light signal transmission is subject to cessation of simultaneous receipt of a first signal and a second signal normally received by the receiver.

8 Claims, 3 Drawing Figures

METHOD AND APPARATUS FOR DETECTING INTERRUPTIONS IN THE TRANSMISSION OF LIGHT SIGNALS

BACKGROUND OF THE INVENTION

1. Field of the Invention

The present invention relates generally to improvements in or relating to the detection of interruptions in the transmission of light signals. More particularly, the present invention is concerned with a method for detecting interruptions in the transmission of light signals wich are transmitted through light conducting means including a loop of a light conductor. Still more particularly, upon being emitted from an emitter, or emitter means, light signals are recognized at one end of the light conductor of said loop and on being detected, by means of a receiver, light signals are transmitted by said light conductor and emitted at the other end of the light conductor of said loop.

The present invention is also concerned with an apparatus for carrying out the method, which apparatus includes an emitter, or emitter means, which is located near one end of a loop of a light conductor, as well as a receiver, or receiver means, which is arranged at the other end of the loop of a light conductor.

2. Description of the Prior Art

Nowadays, more and more there are utilized fiber optical means, or fiber optics, for the transmission of light signals, and the interruption of the transmission of pertaining signals is utilized in the actuation of alarm devices, for example, in surveillance or protection systems. Generally, the light signals are introduced at one end of the fiber, and the signals are received, or identified, at the other end of the fiber, using a detector or receiver.

In such devices, the interruption of a constant signal by the receiving means can be due to failures in the pertaining circuit, but also in the components utilized in transmitting, receiving, or decoding, the transmitted signal, or signals.

SUMMARY OF THE INVENTION

There has continued to remain, therefore, a need for improving the detection systems briefly described above, particularly in recognition that the known devices are not conducive to provide an effective measure to determine the different causes for a disruption of the transmission of a light signal or signals.

In accordance with the present invention it is proposed to alleviate these drawbacks, and it is further proposed to provide an apparatus and method which allow, in substantially instantaneous manner, the determination of the causes of the disruption of a light signal.

In accordance with the present invention, there is provided a method for detecting interruptions in the transmission of a light signal or signals, adapted to be transmitted through a light conducting means, including a loop of a light conductor, in which light signals are observed at one end of said light conductor, on being introduced by means of an emitter or emitter means and, wherein, on being detected by means of a receiver, or receiver means, the light signals are transmitted through said light conductor to the other end of the light conductor of said loop, in such a manner that on simultaneously sending pertaining light signals, transmitted from the emitter to the receiver, through said loop and a direct circuit, connected between said emitter and said receiver, for each signal emitted from said emitter, the receiver captures a first signal transmitted through said loop, and a second signal transmitted through said direct circuit, and that on detecting an interruption in the transmission, the simultaneous reception of the first and second signal normally received by said receiver is ceased.

In accordance with the present invention there is also provided an apparatus for detecting the interruption of the transmission of light signals, transmitted through a light conducting means including a loop of a light conductor, said apparatus comprising an emitter operatively connected to one end of said loop of a light conductor; a receiver, located near to, and operatively connected at, the other end of said loop of a light conductor; and further comprising a direct circuit, mounted between said emitter and said receiver, said direct circuit being adapted to transmit, to the receiver, a signal, or signals, emitted from said emitter without travelling through said loop, in such a manner that said receiver is adapted to substantially simultaneously sense, for each signal emitted by that emitter, two signals respectively transmitted through said loop and said direct circuit.

In accordance with another aspect of the invention, the apparatus includes a direct circuit which is provided by a section of a light conductor whose ends are respectively connected to an emitter and a receiver.

In accordance with another aspect of the invention, the direct circuit includes a transparent block to which are connected, respectively, the two ends of a loop of a light conductor, an emitter and a receiver, with these elements being disposed in such a manner that the light signals, emitted from the emitter, are passing substantially simultaneously to the entry end of the loop and to the receiver, and wherein the signals which pass through the loop are passed to the receiver.

In accordance with yet another aspect of the invention, the transparent block includes a first planar surface onto which is mounted the emitter, and a second planar surface, parallel to said first surface, onto which is mounted the receiver, in such a manner that a portion of the light of each signal emitted is transmitted through said block for being received by said receiver.

Also, in accordance with the invention the ends of the light conductor of said loop are secured in said block, in such a manner that the first end of the light conductor of said loop abuts the face of the emitter and the second end of the light conductor of said loop abuts the face of the receiver.

In accordance with this invention the transparent block of the apparatus is comprised of two juxtaposed elements, made of resinous synthetic material, with the first end of the light conductor of said loop being secured inside that element to which is mounted the emitter, and the second end of the light conductor of said loop being secured to be within that element to which is mounted the receiver, with the two elements being juxtaposed in such a manner that a portion of each light signal passing from said first element to said second element is passed to said receiver.

In accordance with another aspect of the invention, in the apparatus said two elements which form said transparent block are identical in shape, form a rectangular parallelpiped, and are maintained against each other by a fastener, in such a manner that the planar face of one element is maintained operatively against the planar face of the other element.

The method provides an economical signal disruption detection technique, and the apparatus is of compact construction, which is attained at favorable economics, and which exhibits a sturdy construction.

Further embodiments of the invention and other inventive features are contained in the claims.

DESCRIPTION OF THE DRAWINGS

In the drawings, which illustrate that which is presently regarded as the best mode of carrying out the invention.

With reference to FIGS. 1 and 2, the herein described apparatus includes generally a transparent member, or block, 10. The block 10 includes two identical elements 11 and 12, which are arranged to form a rectangular parallelepiped. The two elements of the block 10 are juxtaposed and pressed close together by a connecting means, not shown, in such a way that the face plane 13 of element 11 is firmly supported against the corresponding face plane 13′ of element 12.

Figure 1:
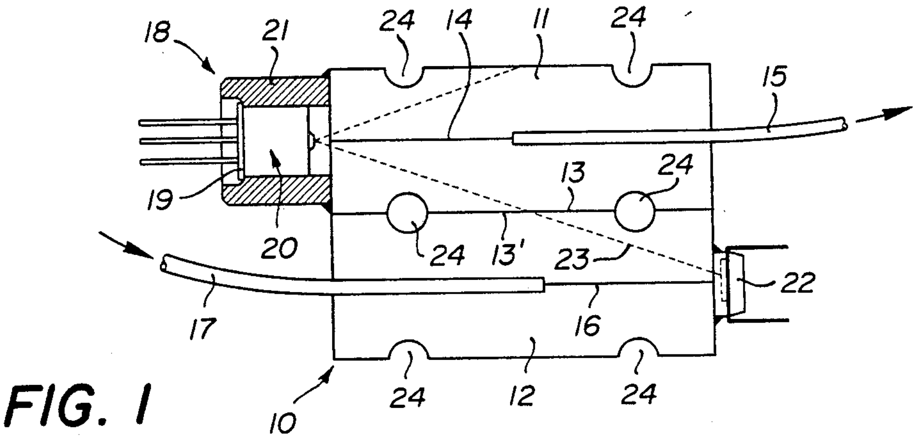
FIG. 1 is a top plan view illustrating one preferred embodiment according to the present invention.

The element 11, preferably made of a transparent synthetic material, is molded around the end 14 of a sheathed fiber optic 15, and the element 12 is molded around the end of 16 of a sheathed fiber optic 17. In practice, the fiber ends 14 and 16 preferably constitute the ends of a fiber optic which forms a loop or circuit in or around a building, or some other location to be maintained under surveillance. However, the ends can also be connected to other fibers, to which they can be connected by suitable known means. At the end of element 11, which is opposite the entry end, or face, of the fiber optic 15, there are mounted an emitter, or emitters means, 18, preferably comprised of a photoemissive diode 19 and an optical coupler 20, having a support 21 which is fixed, for example, by gluing to the entry face of the element 11. At the end of element 12 which is located opposite the entry face of the fiber optic 17, there is mounted a receiver, or receiver means, 22 which serves to detect, for one, the light signal, or signals, transmitted by the end 16 of the fiber optic 17 and, as well, the light signal, or signals, schematically indicated by the dash line 23, emitted by the emitter 18 and passing through the transparent block 10.

In this manner, when the components of the arrangement are operating normally, and when the loop of light conductors, whose entry is defined by the fiber optic 15, and whose exit is defined by fiber optic 17, is not interrupted, the receiver 22 receives, alternatingly, a light signal transmitted through said loop and a light signal transmitted through the direct circuit, that is to say, through the transparent block 10. A decoding device, not shown, allows eventually the actuation of an alarm generating device when the two signals are not alternatingly received by the receiver 22.

Figure 2:
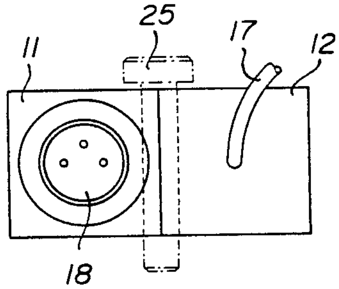
FIG. 2 is a front view of the apparatus shown in FIG. 1.

A plurality of semicircular recesses 24 provide cylindrical receiving sections into which can be introduced centering shafts or rods, or threaded retaining members 25, (see FIG. 2) for mounting the two elements 11 and 12 in their juxtaposed position. However, other retention means may be employed.

The use of the two elements 11 and 12, which are identical, is particularly advantageous in that the assembly of the block 10 can be in modular fashion and does not require separate individual molds. The emitter and receiver are preferably secured by a simple resinous glue.

Figure 3:
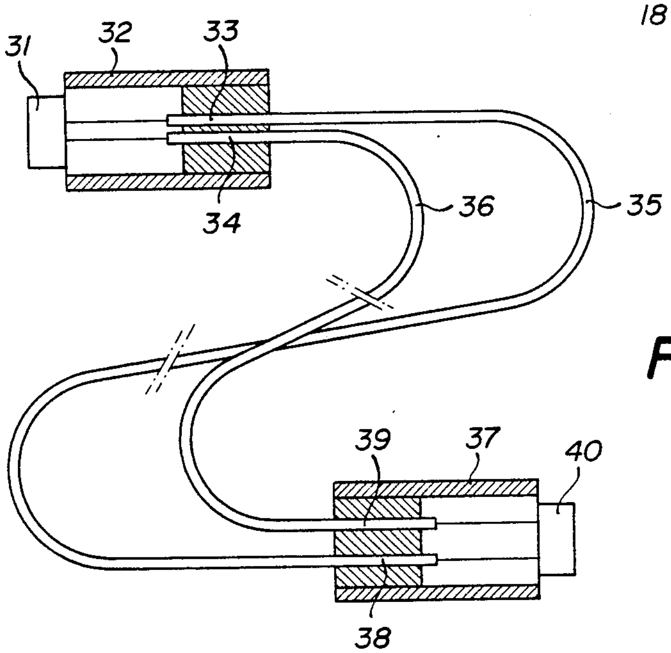
FIG. 3 shows a schematic of another embodiment according to the present invention.

With reference to FIG. 3, the apparatus shown therein includes a emitter 31 mounted on the end of a first element 32, which serves to support the ends 33 and 34 of two conductors of light, preferably fiber optics 35 and 36, which respectively constitute the loop of light conductors, and the direct circuit. The circuit comprises at its other end a second element 37 which serves to support the ends 38 and 39 of the two fiber optics 35 and 36, and a receiver 40.

The principle of operation of this embodiment is generally analogous to that of the embodiment shown in Fig. 1. In the case of the embodiment shown in FIG. 3, the direct circuit is comprised of a segment of the fiber optic and the two elements 32 and 37 are separated and could be made of a material other than a transparent material, considering that the functioning of the elements is only mechanical; with the function of conducting of the light, being carried out by the segment of the fiber optic 36.

Reference in this disclosure to details of the specific embodiments is not intended to restrict the scope of the appended claims, which themselves recite those features regard as essential to the invention.

I claim:

1. In the detection of an interruption in the transmission of a light signal in a system comprising a signal emitter, a signal receiver and a signal conductor loop the opposite ends of which are connected to said signal emitter and said signal receiver, the method of establishing that an interruption of the reception of said signal by said signal receiver is the result of a signal transmission interruption occurring at a point in said signal conductor loop, which comprises: transmitting a first signal through said system while simultanteously transmitting a second signal from said signal emitter to said signal receiver but outside of said system whereby both signals are simultaneously received by said signal receiver, an interruption in the reception of said first signal without a simultaneous interruption in the reception of said second signal establishing that such signal reception interruption results from a transmission interruption of said first signal at a point in said signal conductor loop.

2. In an apparatus for detecting an interruption in the transmission of a first light signal in a system comprising a signal emitter, a signal receiver and a signal conductor loop the opposite ends of which are connected to said signal emitter and to said signal receiver, the improvement for establishing that an interruption of reception of said first signal by said signal receiver results from a signal transmission interruption at a point in said signal conductor loop, which comprises: means for transmitting a second signal from said signal emitter to said signal receiver but outside of said system, said second signal transmission being simultaneous with said first signal transmission whereby both signals are simultaneously received by said signal receiver, an interruption in the reception of said first signal without a simultaneous interruption in the reception of said second signal establishing that such signal reception interruption results from a transmission interruption of said first signal at a point in said signal conductor loop.

3. An apparatus according to claim 2 in which said means comprises a light signal conductor one end of which is connected to said signal emitter and the other end of which is connected to said signal receiver.

4. An apparatus according to claim 3 in which said light signal conductor is a fiber optic.

5. An apparatus according to claim 2 in which said means comprises an element having an entry end on which is mounted said signal emitter and an opposite end on which is mounted said signal receiver, said second signal being transmitted from said signal emitter to said signal receiver by means of said element.

6. An apparatus according to claim 5 in which the emitting and receiving ends of said signal conductor loop extend through said element from opposite ends to said signal emitter and said signal receiver, respectively.

7. An apparatus according to claim 6 in which said element comprises joined correspondingly shaped means on the end of the first of which is said signal emitter and on the opposite end of the second of which is said signal receiver, said emitting and receiving ends of said signal conducting loop extending through said first and second means, respectively.

8. An apparatus according to claim 7 in which said first and second means are transparent.

* * * * *